United States Patent
Kim et al.

(10) Patent No.: US 12,524,025 B2
(45) Date of Patent: Jan. 13, 2026

(54) APPARATUS FOR TREATING SUBSTRATE AND METHOD FOR TREATING A SUBSTRATE

(71) Applicant: SEMES CO., LTD., Chungcheongnam-do (KR)

(72) Inventors: Jae Hong Kim, Chungcheongnam-do (KR); Hyeong Jun Cho, Seoul (KR); Sang Hyun Son, Busan (KR); Sang Min Ha, Gyeonggi-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 517 days.

(21) Appl. No.: 18/147,798

(22) Filed: Dec. 29, 2022

(65) Prior Publication Data

US 2023/0205235 A1   Jun. 29, 2023

(30) Foreign Application Priority Data

Dec. 29, 2021 (KR) .................. 10-2021-0191439
Nov. 23, 2022 (KR) .................. 10-2022-0158095

(51) Int. Cl.
*G05D 7/06* (2006.01)
*B08B 3/02* (2006.01)
(Continued)

(52) U.S. Cl.
CPC ............ *G05D 7/0623* (2013.01); *B08B 3/02* (2013.01); *B08B 13/00* (2013.01); *G01F 1/667* (2013.01);
(Continued)

(58) Field of Classification Search
CPC .. G05D 7/0623; G05D 7/0635; G05D 7/0688; H01L 21/02057; H01L 21/67051;
(Continued)

(56) References Cited

U.S. PATENT DOCUMENTS 11,053,668 B1 * 7/2021 Manning ................ E03B 7/003
2007/0191990 A1 * 8/2007 Duan ...................... G01F 1/667
                                                                 700/282

(Continued)

FOREIGN PATENT DOCUMENTS

JP         2005-37290 A     2/2005
KR    10-2011-0065340 A     6/2011
(Continued)

OTHER PUBLICATIONS

Korean Office Action issued in corresponding KR Patent Application No. 10-2022-0158095, dated May 10, 2024, with English translation.

*Primary Examiner* — Christopher W Carter
(74) *Attorney, Agent, or Firm* — Carter, DeLuca & Farrell LLP

(57) ABSTRACT

The present invention provides a method for treating a substrate. The method for treating a substrate comprises: a monitoring step of calculating a flow rate of a liquid, comparing the calculated measurement flow rate of the liquid with a set flow rate of the liquid in a normal state, and determining whether an error occurs in the measurement flow rate; and when an error is determined to occur in the measurement flow rate in the monitoring step, a feedback step of performing feedback control of a discharge flow rate of the liquid discharged to the substrate, wherein the feedback step determines a type of the error, and differently performs the feedback control according to the determined type of the error.

17 Claims, 6 Drawing Sheets

(51) Int. Cl.
  *B08B 13/00* (2006.01)
  *G01F 1/667* (2022.01)
  *H01L 21/02* (2006.01)

(52) U.S. Cl.
  CPC ...... *G05D 7/0635* (2013.01); *H01L 21/02057* (2013.01)

(58) Field of Classification Search
  CPC ......... H01L 21/67173; H01L 21/67253; H01L 21/67288; H01L 21/67742; H01L 21/0274; H01L 21/67069; H01L 22/10; H01L 22/20; H01L 21/6715; G01F 1/667; G01F 15/005; G01F 25/10; B08B 3/02; B08B 13/00; F17D 3/01
  See application file for complete search history.

(56) References Cited

U.S. PATENT DOCUMENTS

2013/0283929 A1* 10/2013 Ando ................ G01F 1/66
  73/861.27
2015/0088321 A1* 3/2015 Schmidt ............ G05B 13/02
  700/282

FOREIGN PATENT DOCUMENTS

| | | |
|---|---|---|
| KR | 10-2012-0013457 A | 2/2012 |
| KR | 10-2013-0121019 A | 11/2013 |

* cited by examiner

APPARATUS FOR TREATING SUBSTRATE AND METHOD FOR TREATING A SUBSTRATE

CROSS-REFERENCE TO RELATED APPLICATIONS

This application claims priority to and the benefit of Korean Patent Application Nos. 10-2021-0191439 and 10-2022-0158095 filed in the Korean Intellectual Property Office on Dec. 29, 2021, and Nov. 23, 2022, the entire contents of which are incorporated herein by reference.

TECHNICAL FIELD

The present invention relates to an apparatus for treating a substrate and a method for treating a substrate, and more particularly, to an apparatus for treating a substrate that supplies liquid to the substrate and treats the substrate and a method for treating a substrate.

BACKGROUND ART

In general, various processes such as a photo process, an etching process, an ion implantation process, and a deposition process are performed so as to manufacture a semiconductor device. In each process, a liquid is supplied to the substrate to perform a predetermined treatment.

In the liquid supply device for supplying the liquid to the substrate, a measurement unit that monitors a flow rate of the liquid in real time is disposed to stably supply the liquid to the substrate. A flow rate of the liquid currently supplied to the substrate is determined based on the flow rate of the liquid monitored by the measurement unit. In addition, based on the flow rate of the liquid monitored by the measurement unit, as an opening and closing rate of a valve installed in a pipe through which the liquid flows is adjusted, the flow rate of the liquid supplied to the substrate is adjusted according to the recipe.

As mentioned above, since the opening and closing rate of the valve is adjusted based on the flow rate of the liquid measured by the measurement unit, if the measurement unit fails to accurately measure the flow rate of the liquid flowing through the pipe (if an error occurs), a liquid with a suitable flow rate for the recipe cannot be supplied to the substrate. In addition, when the flow rate of the liquid flowing in the pipe is not measured due to various reasons, a flow rate hunting phenomenon occurs. For example, when the measured liquid flow rate is zero due to a measurement error, the flow of the liquid is determined to stop in the pipe and a large amount of liquid is temporarily supplied to the substrate. Since this makes it difficult to accurately determine the current state of the liquid supplied to the substrate, the substrate is difficult to treat according to the recipe. Furthermore, when the flow rate hunting phenomenon occurs, this may cause a process failure.

SUMMARY OF THE INVENTION

The present invention has been made in an effort to provide an apparatus for treating a substrate and a method for treating a substrate which can efficiently treat the substrate.

The present invention has also been made in an effort to provide an apparatus for treating a substrate and a method for treating a substrate which can efficiently supply a liquid according to a recipe.

The object of the present invention is not limited thereto, and other objects not mentioned will be clearly understood by those of ordinary skill in the art from the following description.

An exemplary embodiment of the present invention provides a method for treating a substrate, including: a monitoring step of calculating a flow rate of a liquid, comparing the calculated measurement flow rate of the liquid with a set flow rate of the liquid in a normal state, and determining whether an error occurs in the measurement flow rate; and when an error is determined to occur in the measurement flow rate in the monitoring step, a feedback step of performing feedback control of a discharge flow rate of the liquid discharged to the substrate, the feedback step determines a type of the error, and differently performs the feedback control according to the determined type of the error.

According to the exemplary embodiment, the type of the error may include: a first error state in which the measurement flow rate deviates from the range of the set flow rate, but the measurement flow rate is calculated; and a second error condition in which the measurement flow rate is not calculated.

According to the exemplary embodiment, the feedback step may include a first feedback mode performed in the first error state, and the first feedback mode may change at least one of a period of feedback control, a range of the set flow rate, and an opening and closing rate of a valve configured to control the discharge flow rate.

According to the exemplary embodiment, in the first feedback mode, the period of feedback control may be adjusted shorter than that of the normal state.

According to the exemplary embodiment, in the first feedback mode, an upper limit of the set flow range may be lowered and a lower limit of the set flow range may be increased.

According to the exemplary embodiment, the first feedback mode, the opening and closing rate of the valve may be adjusted smaller than that of the normal state.

According to the exemplary embodiment, the feedback step may further include a second feedback mode performed in the second error state, and the second feedback mode may calculate current predictive flow rate data of the liquid based on the set flow rate and perform feedback control of the discharge flow rate based on the predictive flow rate data.

According to the exemplary embodiment, in the monitoring step, the measurement flow rate may oscillate ultrasonic waves at one point of a pipe through which the liquid flows, receive the ultrasonic waves at the other point of the pipe, and measure and calculate an arrival time of the ultrasonic waves from the one point to the other point.

According to the exemplary embodiment, the error may occur when bubbles are present in the liquid.

According to the exemplary embodiment, the first error state may include a state in which the ultrasonic waves oscillated into the pipe is refracted by the bubbles and received, and a signal of the ultrasonic waves is delayed.

According to the exemplary embodiment, the second error state may include a state in which the ultrasonic wave oscillated into the pipe is refracted by the bubbles, and the signal of the ultrasonic waves is not received.

According to the exemplary embodiment, the liquid may include a cleaning liquid that cleans the substrate.

Another exemplary embodiment of the present invention provides a method for controlling a flow rate, the method including: a monitoring step of oscillating ultrasonic waves at one point in a pipe through which a fluid flows, receiving the ultrasonic waves at the other point of the pipe, measuring an arrival time of the ultrasonic waves from one point to the other point to calculate a measurement flow rate of the liquid flowing in the pipe, and determining an error of the measurement flow rate by comparing the measurement flow rate with a set flow rate of the liquid in a normal state; a feedback mode setting step of determining the type of error; and a feedback step of differently performing feedback control of a discharge flow rate of the liquid discharged to a target according to the type of error determined in the feedback mode setting step, and the feedback step includes: a first feedback mode performed in a first error state in which the measurement flow rate is calculated in a state in which the measurement flow rate deviates from a range of the set flow rate; and a second feedback mode performed in a second error state in which the measurement flow rate is not calculated.

According to the exemplary embodiment, the first feedback mode may change at least one of a period of the feedback control, the range of the set flow rate, and an opening and closing rate of a valve adjusting the discharge flow rate.

According to the exemplary embodiment, the second feedback mode calculates predictive flow rate data based on the set flow rate in the normal state, and performs feedback control of the discharge flow rate based on the predictive flow rate data.

According to the exemplary embodiment, the error is generated bubbles that are present in the pipe.

Still another exemplary embodiment of the present invention, including: a support unit configured to support the substrate; a nozzle configured to discharge a liquid to a substrate supported by the support unit; a pipe connected to the nozzle to allow the liquid to flow inside; a sensor configured to oscillate ultrasonic waves at one point inside the pipe and receives the ultrasonic waves at the other point inside the pipe; a valve installed in the pipe and configured to control an opening and closing rate of the pipe; and a controller configured to measure an arrival time of the ultrasonic waves from one point to the other to calculate a measurement flow rate of the liquid flowing in the pipe and perform feedback control of the opening and closing rate of the valve according to the measurement flow rate, and the controller determines an error of the measurement flow rate by comparing the measurement flow rate with a set flow rate of the liquid in a normal state and differently performs feedback control of the opening and closing rate of the valve according to a type of the determined error.

According to the exemplary embodiment, when the measurement flow rate deviates from the range of the set flow rate but the measurement flow rate is calculated, the controller changes at least one of a period of the feedback control, a range of the set flow rate, and the opening and closing rate of the valve.

According to the exemplary embodiment, when the measurement flow rate is not calculated, the controller calculates predictive flow rate data of a current liquid based on the set flow rate of the liquid in the normal state and performs feedback control of the opening and closing rate of the valve based on the predictive flow data.

According to the exemplary embodiment, the sensor is a piezoelectric element.

According to the exemplary embodiment of the invention, a substrate can be efficiently treated.

According to the exemplary embodiment of the present invention, even if an error occurs in a measurement the flow rate of the liquid, the liquid may be supplied according to the recipe.

According to the exemplary embodiment of the present invention, even if the flow rate of the liquid is not measured, the liquid may be supplied according to the recipe.

The effect of the present invention is not limited to the foregoing effects, and the not-mentioned effects will be clearly understood by those skilled in the art from the present specification and the accompanying drawings.

DETAILED DESCRIPTION

Figure 1:
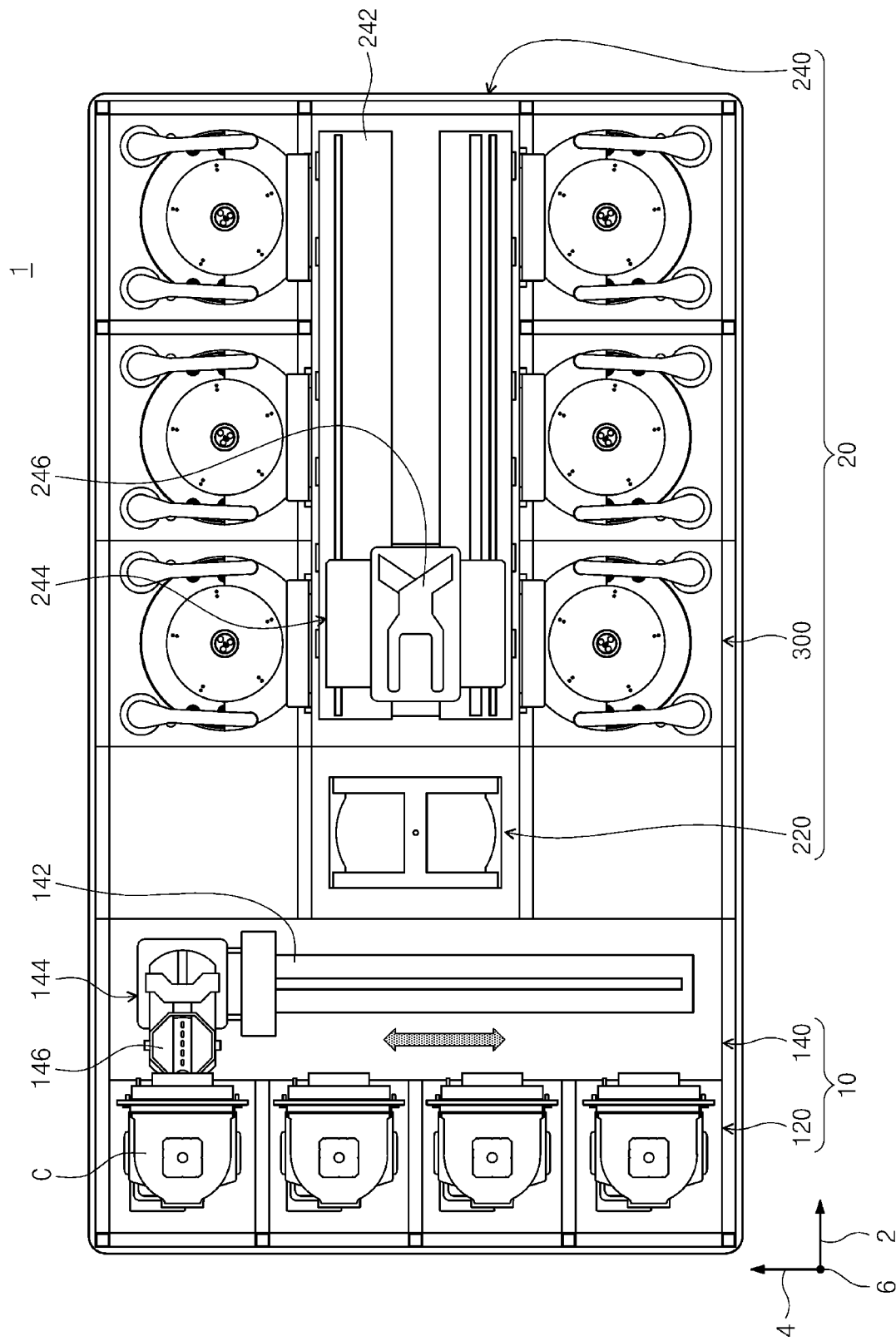
FIG. 1 is a cross-sectional view schematically illustrating an apparatus for treating a substrate according to one embodiment.

Hereinafter, exemplary embodiments of the present invention will be described in more detail with reference to the accompanying drawings. An exemplary embodiment of the present invention may be modified in various forms, and the scope of the present invention should not be construed as being limited by the exemplary embodiment described below. The present exemplary embodiment is provided to more completely explain the present invention to those skilled in the art. Therefore, the shapes of components in the drawings are exaggerated to emphasize a clearer description.

Although the terms first, second, etc. may be used to describe various elements, it should be understood that these elements are not limited by these terms. These terms are only used to distinguish one element from another. For example, a first element to be described below could be termed as a second element, without departing from the scope of exemplary embodiments.

FIG. 1 is a cross-sectional view schematically illustrating an apparatus for treating a substrate according to one embodiment.

Referring to FIG. 1, an apparatus 1 for treating a substrate includes an index module 10 and a treating module 20. According to one embodiment, the index module 10 and the treating module 20 are disposed in one direction. Hereinafter, a direction in which the index module 10 and the treating module 20 are disposed is defined as a first direction 2. Further, when viewed from the top, the direction perpendicular to the first direction 2 is defined as a second direction 4, and the direction perpendicular to the plane including both the first direction 2 and the second direction 4 is defined as a third direction 6. For example, the third direction 6 may be a direction perpendicular to the ground.

The index module 10 transfers the substrate between a container C and the treating module 20. The index module 10 transfers the treated substrate in the treating module 20 to the container C. In addition, the index module 10 transfers the substrate on which a predetermined treating is scheduled in the container C to the treating module 20. The index module 10 has a longitudinal direction parallel to the second direction 4. The index module 10 has a load port 120 and an index frame 140.

The container C in which the substrate is accommodated is seated in the load port 120. The load port 120 is disposed at an opposite side of the treating module 20 based on the index frame 140. In addition, a plurality of load ports 120 may be provided. The plurality of load ports 120 are arranged in a line along the second direction 4. The number of load ports 120 may increase or decrease according to process efficiency and a foot print condition of the treating module 20.

A plurality of slots (not illustrated) for accommodating a substrate are formed inside the container C. A sealing container such as a front opening unified pod (FOUP) may be used as the container C. The container C may be disposed in the load port 120 by an operator or a transfer means (not illustrated) such as an overhead transfer, an overhead conveyor, or an automatic guided vehicle.

An index rail 142 and an index robot 144 are disposed inside the index frame 140. The index rail 142 has a longitudinal direction horizontal to the second direction 4. The index robot 144 transfers the substrate. The index robot 144 transfers the substrate between the container C and the buffer unit 220 described below. The index robot 144 is disposed on the index rail 142 and moves forward or backward along the longitudinal direction of the index rail 142.

The index robot 144 has an index hand 146. A substrate may be disposed in on the index hand 146. The index hand 146 rotates around the third direction 6 as an axis and moves up and down along the third direction 6. A plurality of index hands 146 may be provided. Each of a plurality of index hands 146 may be spaced apart from each other in the vertical direction. A plurality of index hands 146 may move forward or backward, and rotate independently of each other.

The treating module 20 may include a buffer unit 220, a transfer frame 240, and a process chamber 300.

The buffer unit 220 provides a space in which the substrate temporarily stays. More specifically, the buffer unit 220 provides a space in which the substrate taken into the treating module 20 and the substrate taken out of the treating module 20 temporarily stay. The buffer unit 220 is disposed between the index frame 140 and the transfer frame 240 described below. Accordingly, the index frame 140, the buffer unit 220, and the transfer frame 240 are sequentially arranged in the first direction 2.

A plurality of slots (not illustrated) in which the substrate is seated are disposed inside the buffer unit 220. front and rear faces of the buffer unit 220 are opened. The front face is a surface facing the index frame 140, and the rear face is a surface facing the transfer frame 240. The index robot 144 may seat the substrate in a slot (not illustrated) disposed in the buffer unit 220 through the front face thereof. In addition, the transfer robot 244, which will be described below, may seat the substrate in a slot (not illustrated) disposed in the buffer unit 220 through the rear face thereof.

The transfer frame 240 provides a space for transferring the substrate between the buffer unit 220 and the process chamber 300. In addition, the transfer frame 240 provides a space for transferring the substrate between the process chambers 300.

The transfer frame 240 has a longitudinal direction parallel to the first direction 2. The process chambers 300 may be disposed on opposite sides of the transfer frame 240. The transfer frame 240 and the process chamber 300 are disposed along the second direction 4.

A guide rail 242 and a transfer robot 244 are disposed inside the transfer frame 240. The guide rail 242 has a longitudinal direction parallel to the longitudinal direction of the transfer frame 240. The transfer robot 244 is disposed on the guide rail 242. The transfer robot 244 moves linearly along the longitudinal direction of the guide rail 242 on the guide rail 242. The transfer robot 244 transfers the substrate between the buffer unit 220 and the process chamber 300 and between the process chambers 300. The transfer robot 244 has a transfer hand 246 that transfers the substrate. Since the structure of the transfer hand 246 is mostly the same as or similar to the structure of the index hand 146 described above, a redundant description thereof will be omitted.

A plurality of process chambers 300 may be provided. According to one embodiment, the process chambers 300 may be disposed at opposite sides of the transfer frame 240. In addition, the process chambers 300 may be arranged in an array of A×B (A and B being 1 or a natural number greater than 1, respectively) along the first direction 2 and the third direction 6 on one side of the transfer frame 240. Here, A is the number of process chambers 300 arranged in a line along the first direction 2, and B is the number of process chambers 300 arranged in a line along the third direction 6. For example, when four or six process chambers 300 are disposed on one side of the transfer frame 240, the process chambers 300 may be arranged in an array of 2×2 or 3×2. The above-described example is only for convenience of understanding, and the number of process chambers 300 may increase or decrease. Unlike the above-described example, the process chambers 300 may be disposed only on one side of the transfer frame 240. In addition, the process chambers 300 may be disposed in a single layer on one side and both sides of the transfer frame 240.

In the process chamber 300, a liquid treatment process of treating the substrate by supplying the liquid to the substrate may be performed. According to one embodiment, the liquid treatment process may be a cleaning process of cleaning the substrate by supplying a cleaning liquid to the substrate. For example, the process chamber 300 may be a chamber that performs a cleaning process of removing process byproducts attached to the substrate. In addition, in the process chamber 300, a chemical treatment, a rinse treatment, and a drying treatment of the substrate may all be performed. Unlike the above-described arrangement, a process chamber that dries and treats the substrate may be provided separately from a process chamber that performs a liquid treatment. The process chambers 300 may have different structures depending on the type of process for treating the substrate. Alternatively, the process chambers 300 may have the same structure.

Figure 2:
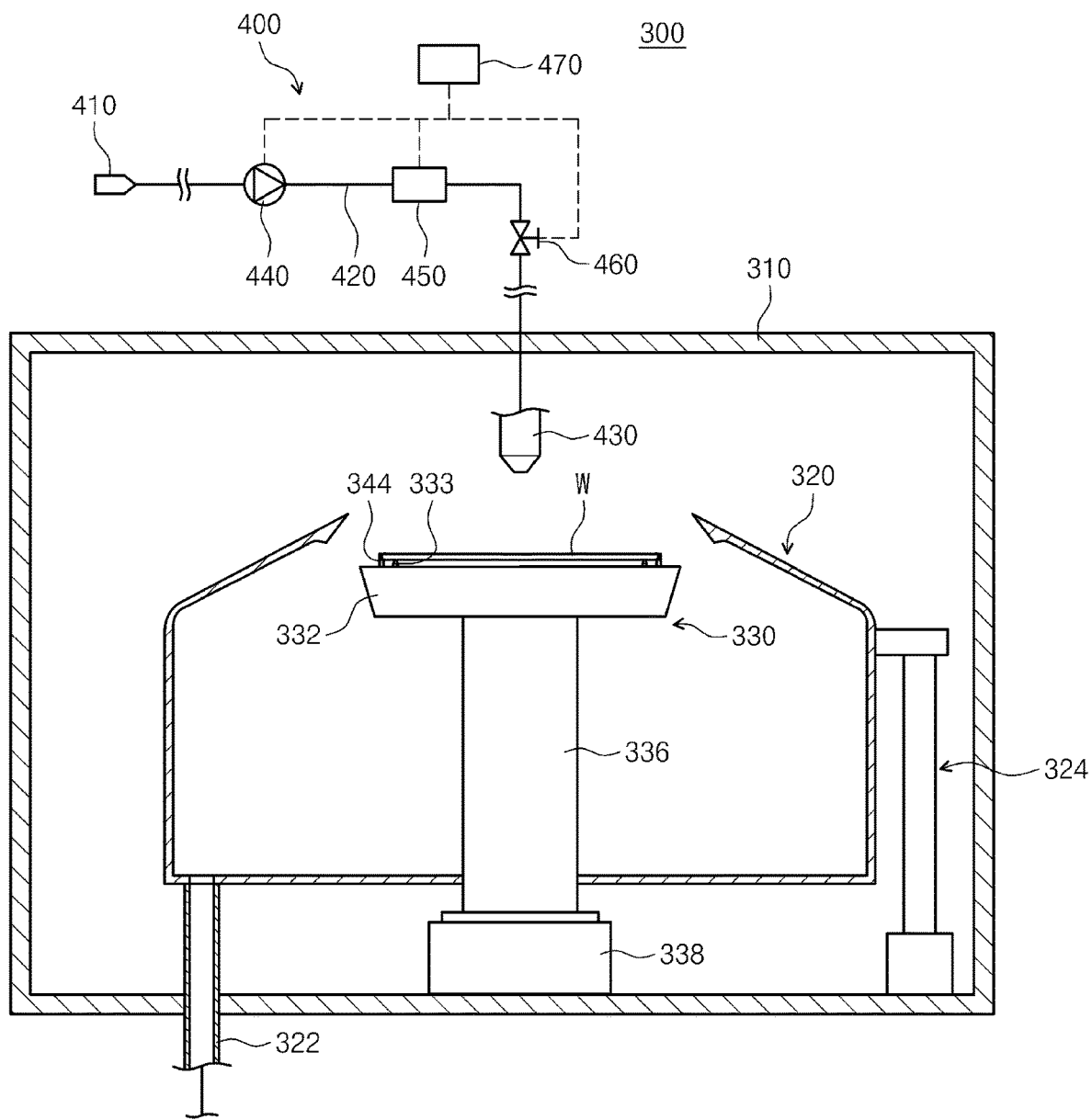
FIG. 2 is a cross-sectional view schematically illustrating a process chamber according to one embodiment.

FIG. 2 is a cross-sectional view schematically illustrating a process chamber according to one embodiment.

Referring to FIG. 2, the process chamber 300 may include a housing 310, a treatment container 320, a support unit 330, and a liquid supply unit 400.

The housing 310 has an inner space. The housing 310 may have a substantially rectangular parallelepiped shape. An opening (not illustrated) is formed in one side of the housing 310. The opening (not illustrated) functions as an entrance through which the substrate W is taken into the inner space or the substrate W is taken out of the inner space. Although not illustrated, a fan filter unit that supplies airflow to the inner space may be installed on a ceiling of the housing 310, and a hole for exhausting an atmosphere of the inner space may be formed on the bottom of the housing 310. The treatment container 320 and the support unit 330 are disposed in the inner space.

According to one embodiment, the treatment container 320 may be a bowl of which the upper part is opened. That is, the treatment container 320 may have a cup shape of which the upper part is opened. An interior of the treatment container 320 functions as a treatment space in which the substrate W is treated. The treatment space may be a space in which the support unit 330 described below supports and rotates the substrate W. In addition, the treatment space may be a space in which the liquid supply unit 400 described below supplies liquid to the substrate W and treats the substrate W.

A bottom part of the treatment container 320 may be formed in the shape of a disk with a hollow. A support shaft 336 described below may be inserted into the hollow formed in the bottom part of the treatment container 320. A recovery line 322 is connected to the bottom part of the treatment container 320. The recovery line 322 recovers the liquid supplied to the substrate W. The liquid recovered by the recovery line 322 may be reused by an external regeneration system (not illustrated).

A side part of the treatment container 320 extends upwardly from the bottom portion. In addition, the side part of the treatment container 320 has a substantially ring shape. The side part of the treatment container 320 may surround the body 332 described below and the support shaft 336. An inclined part of the treatment container 320 extends from the side part of the treatment container 320. More specifically, the inclined part of the treatment container 320 may extend in a direction leading from an upper end of the side part of the treatment container 320 to a central axis of the support shaft 336. In addition, the inclined part of the treatment container 320 may be inclined upwardly toward the support shaft 336.

Unlike the above-described example, the treatment container 320 may have a plurality of cup bodies. For example, the treatment container 320 may have an outer cup, an intermediate cup, and an inner cup. The inner cup may have a shape corresponding to the shape of the treatment container 320 described above. In addition, the intermediate cup may have a shape surrounding the inner cup from the outside of the inner cup. In addition, the outer cup may have a shape surrounding the intermediate cup from the outside of the intermediate cup. In addition, unlike the above-described example, an exhaust line (not illustrated) that exhausts the atmosphere of the treatment space may be connected to the bottom of the treatment container 320.

A lifting unit 324 is coupled to the treatment container 320. The lifting unit 324 may lift the treatment container 320. The lifting unit 324 may be any one of known motors for transmitting a driving force. According to one embodiment, the lifting unit 324 may move the treatment container 320 upward when treating the substrate W. In addition, the lifting unit 324 may move the treatment container 320 downward after completing the treating of the substrate W or before treating the substrate W.

The support unit 330 supports and rotates the substrate W. The support unit 330 may include a body 332, a support shaft 336, and a driver 338.

The substrate W is seated in an upper surface of the body 332. The upper surface of the body 332 has a substantially circular shape when viewed from the top. The upper surface of the body 332 may have a diameter larger than that of the substrate W.

The support pin 333 is disposed in an upper portion of the body 332. A plurality of support fins 333 are provided. The support fins 333 may be spaced apart from each other in an edge region of the body 332 at regular intervals. The plurality of support pins 333 are disposed to have a ring shape on the whole by a combination thereof. In addition, the support pin 333 protrudes upward from an upper surface of the body 332. Accordingly, the support pins 333 support a rear edge region of the substrate W so that the substrate W is spaced apart from the upper surface of the body 332.

A chuck pin 334 is disposed on an upper part of the body 332. A plurality of chuck pins 334 are provided. The chuck pin 334 is disposed closer to the edge region of the body 332 than the support pin 333. The chuck pin 334 protrudes upwardly from the upper surface of the body 332. The chuck pin 334 supports the side part of the substrate W such that the substrate W does not deviate from a given position in a lateral direction when the substrate W rotates.

The support shaft 336 is coupled to the body 332. More specifically, the support shaft 336 is coupled to a lower end of the body 332. Furthermore, the lower end of the support shaft 336 may be inserted into the hollow formed in the bottom part of the treatment container 320 described above. The support shaft 336 has a vertical longitudinal direction. The driver 338 is coupled to the support shaft 336. The driver 338 rotates the support shaft 336 around the longitudinal direction of the support shaft 336 as an axis. The driver 338 may be a known motor that transmits a rotational force.

The liquid supply unit 400 supplies the liquid to the substrate W. More specifically, the liquid supply unit 400 supplies the liquid to the substrate W supported by the support unit 330. The liquid supply unit 400 may supply at least one cleaning liquid to the substrate W. For example, the cleaning liquid may be at least one of chemical, pure water (or deionized water), and an organic solvent (e.g., isopropyl alcohol). Furthermore, the cleaning liquid may be a liquid containing a polymer and a solvent. The liquid according to one embodiment includes various types of liquid not illustrated above. That is, the liquid according to one embodiment includes all the various types of liquid used when treating the substrate W.

Figure 3:
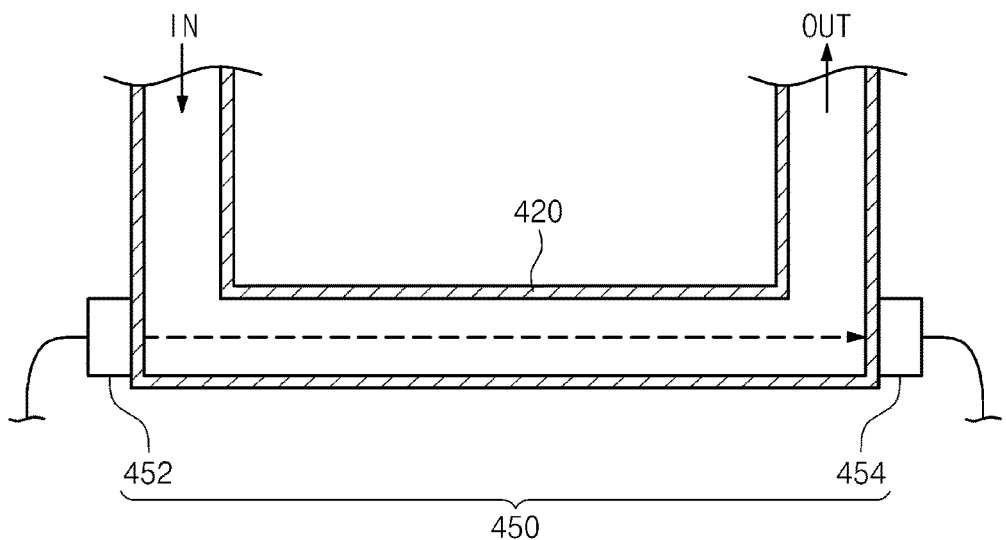
FIG. 3 is a cross-sectional view schematically illustrating a state in which a sensor according to one embodiment is installed.

FIG. 3 is a cross-sectional view schematically illustrating a state in which a sensor according to one embodiment is installed.

Hereinafter, the liquid supply unit 400 according to one embodiment will be described with reference to FIGS. 2 and 3.

The liquid supply unit 400 may include a liquid supply source 410, a pipe 420, a nozzle 430, a pump 440, a sensor 450, a valve 460, and a controller 470.

The liquid supply source 410 stores the liquid. The liquid supply source 410 is connected to the pipe 420. One end of the pipe 420 is connected to the liquid supply source 410, and the other end thereof is connected to the nozzle 430. The nozzle 430 is disposed in the inner space of the housing 310.

In addition, the nozzle 430 is disposed above the support unit 330. The nozzle 430 discharges the liquid received from the liquid supply source 410 to the substrate W supported by the support unit 330. Although FIG. 2 illustrates that one nozzle 430 is provided, a plurality of nozzles 430 may be provided. For example, the number of a plurality of nozzles 430 may be determined according to the type of liquid supplied to the substrate W.

A pump 440, a sensor 450, and a valve 460 may be installed in the pipe 420. The pump 440 supplies a flow pressure into the pipe 420 such that the liquid stored in the liquid supply source 410 flows along the pipe 420. For example, the pump 440 may be a bellows type pump using the flow pressure. However, the present invention is not limited thereto, and the pump 440 may be any one of known devices capable of supplying fluidity in the pipe 420.

The sensor 450 according to one embodiment may be a piezoelectric transducer. The sensor 450 is installed outside the pipe 420. The sensors 450 may be formed in pairs. For example, the sensor 450 may include an oscillator 452 and a receiver 454. The oscillator 452 and the receiver 454 are disposed to face each other. The oscillator 452 resonates with applied electricity to oscillate ultrasonic waves into the pipe 420. In addition, the oscillator 452 oscillates the ultrasonic waves in the same direction as a flow direction of the liquid flowing inside the pipe 420. That is, the oscillator 452 oscillates the ultrasonic waves from one point of the pipe 420 to the other point of the pipe 420 in which the receiver 454 is installed. The receiver 454 receives the ultrasonic waves oscillated into the pipe 420.

The valve 460 according to one embodiment may be a flow rate adjustment valve. For example, the valve 460 may adjust the flow rate of the liquid flowing in the pipe 420 by adjusting an opening and closing rate. The valve 460 may be connected to the controller 470 described below in a wireless or wired manner. The valve 460 may adjust an opening and closing rate according to a signal of the controller 470.

In addition, an opening/closing valve (not illustrated) may be further installed in the pipe 420. For example, the opening/closing valve may be installed more downstream of the pipe 420 than the valve 460. When the opening/closing valve (not illustrated) is opened, the liquid in the pipe 420 is transmitted to the nozzle 430 and discharged to the substrate W. When the opening/closing valve (not illustrated) is closed, the flow of the liquid transferred to the nozzle 430 is blocked.

The controller 470 controls the liquid supply unit 400. The controller 470 may control components included in the liquid supply unit 400 so as to perform the method for treating a substrate described below. The controller 470 may include a process controller composed of microprocessors (computers) configured to execute control, a keyboard through which the operator performs a command input operation to manage the apparatus 1 for treating a substrate, a user interface composed of a display that visualizes and displays an operation status of the apparatus 1 for treating a substrate, and a database that stores treatment recipes or images, or a control program, a program for executing treatment on each component according to all kinds of data and treatment conditions or a matching program that determines whether a stored image matches an acquired image. In addition, the user interface and the database may be connected to the process controller.

The controller 470 may be connected to the pump 440, the sensor 450, and the valve 460 in a wireless or wired manner.

The controller 470 may store data on the set flow rate determined according to the recipe. The set flow rate data may be flow rate data of the liquid that has to be supplied to the substrate W according to the recipe. The controller 470 transmits the set flow rate data to the pump 440. The pump 440 supplies the flow pressure inside the pipe 420 based on the transmitted set flow rate data. Accordingly, in a normal state, the liquid flowing in the pipe 420 may be discharged to the substrate W through the nozzle 430 while having the set flow rate. The normal state may mean a case in which foreign substances or bubbles do not exist inside the pipe 420. Accordingly, in the normal state, the set flow rate may coincide with and the measurement flow rate described below. In addition, in the normal state, the set flow rate, a measurement flow rate, and a discharge flow rate of the liquid discharged from the nozzle 430 may coincide with each other. That is, in the normal state, the set flow rate may be returned to the discharge flow rate unchangeably.

The controller 470 is connected to the sensor 450 to calculate a measurement flow rate of the liquid flowing in the pipe 420. A detailed description thereof will be described below. In addition, the controller 470 is connected to the valve 460 to adjust the opening and closing rate of the valve 460. For example, the controller 470 adjusts the opening and closing rate of the valve 460 based on calculated measurement flow rate data.

Hereinafter, the method for treating a substrate according to one embodiment of the present invention will be described. Since the method for treating a substrate described below is performed by the apparatus 1 for treating a substrate, the reference numerals used in FIGS. 1 to 3 are applied in the same manner as follows.

Figure 4:
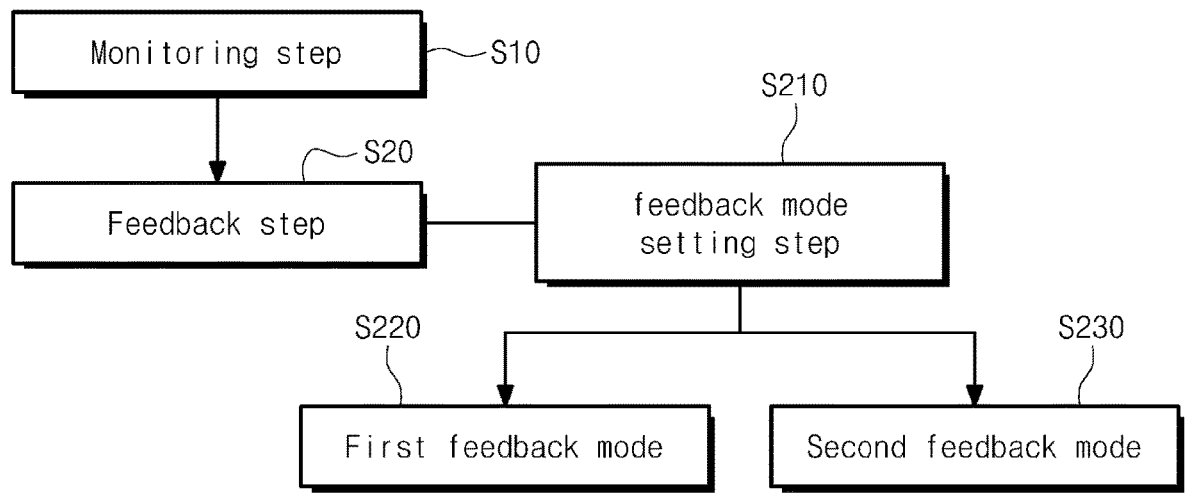
FIG. 4 is a flowchart of a method for treating a substrate according to one embodiment.

FIG. 4 is a flowchart of the method for treating a substrate according to one embodiment.

Referring to FIG. 4, the method for treating a substrate according to one embodiment includes a monitoring step S10 and a feedback step S20.

In the monitoring step S10, the flow rate of the liquid flowing in the pipe 420 is measured. As described above, the oscillator 452 oscillates the ultrasonic waves into the pipe 420, and the receiver 454 receives the oscillated ultrasonic waves. The oscillator 452 and the receiver 454 transmit data on the time when the ultrasonic waves are oscillated and data on the time when the ultrasonic waves are received to the controller 470, respectively. The controller 470 may calculate in real time the measurement flow rate of the liquid flowing in the pipe 420 using a pre-stored straight distance between the oscillator 452 and the receiver 454 and received time data.

In the monitoring step S10, the controller 470 compares calculated measurement flow rate with the set flow rate in the normal state. More specifically, the controller 470 may determine whether the calculated measurement flow rate deviates from a range of the set flow rate (hereinafter, a set flow rate range) in a normal state. The set flow rate range may be determined by weighting the set flow rate. For example, when the set flow rate is 1,000 (mL/min), the set flow rate range may be set to 800 (mL/min) to 1,200 (mL/min). However, this is only illustrated for understanding, and the scope of the present invention is not limited thereto.

Subsequently, when the measurement flow rate calculated by the controller 470 deviates from the set flow rate range, the controller 470 may determine that an error has occurred in the calculated measurement flow rate. When the error is determined to have occurred in the measurement flow rate, the controller 470 performs the feedback step S20.

In the feedback step S20, the discharge flow rate of the liquid discharged to the substrate W is feedback-controlled.

More specifically, in the feedback step S20, the discharge flow rate of the liquid discharged to the substrate W may be feedback-controlled by adjusting the opening and closing rate of the valve 460.

According to one embodiment, the feedback step S20 may include a feedback mode setting step S210, a first feedback mode S220, and a second feedback mode S230.

In the feedback mode setting step S210, the controller 470 determines the type of error occurring in the measurement flow rate. The type of error according to one embodiment may include a first error state and a second error state. The first error state may mean a case in which the measurement flow rate deviates from the set flow rate range, but the measurement flow rate data is calculated. In addition, the second error state may mean a case in which not only does the measurement flow rate deviate from the set flow rate range, but also the measurement flow rate is calculated as zero. That is, in the second error state, the measurement flow rate data may not be calculated.

Feedback control may be performed differently according to the type of error determined in the feedback mode setting step S210. According to one embodiment, when the error is determined as the first error state, the first feedback mode S220 may be performed. In addition, when the error is determined as the second error state, the second feedback mode S230 may be performed. The first feedback mode S220 and the second feedback mode S230 may have different control targets and control methods. According to one embodiment, the first feedback mode S220 may change at least one of a set flow rate range, a feedback control period, and an opening and closing rate of the valve 460. According to one embodiment, the second feedback mode S230 may change the opening and closing rate of the valve 460 by using current flow rate data of the liquid calculated based on the set flow rate.

Figure 5:
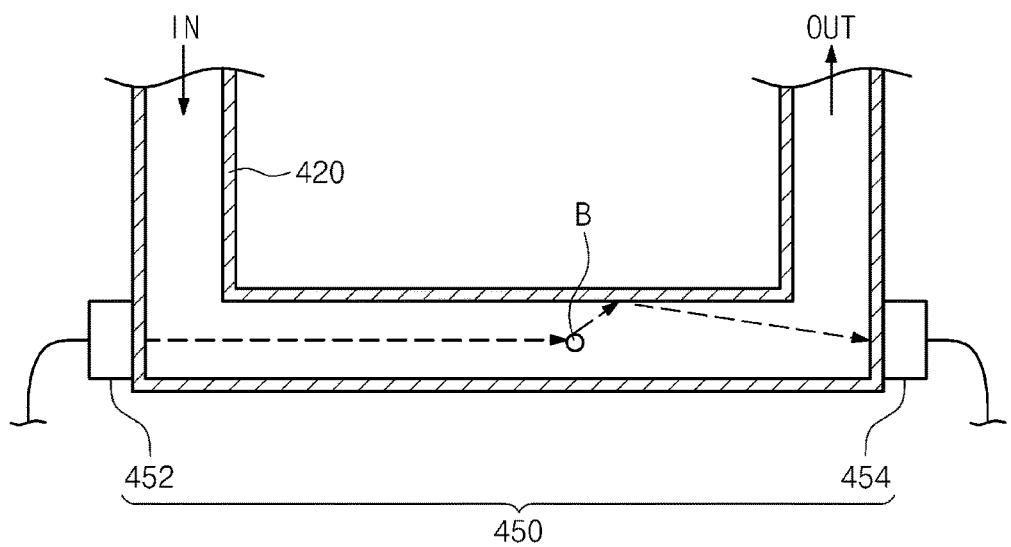
FIG. 5 is a view schematically illustrating a state in which a received ultrasonic signal is delayed due to the presence of bubbles in a pipe according to one embodiment.
Figure 6:
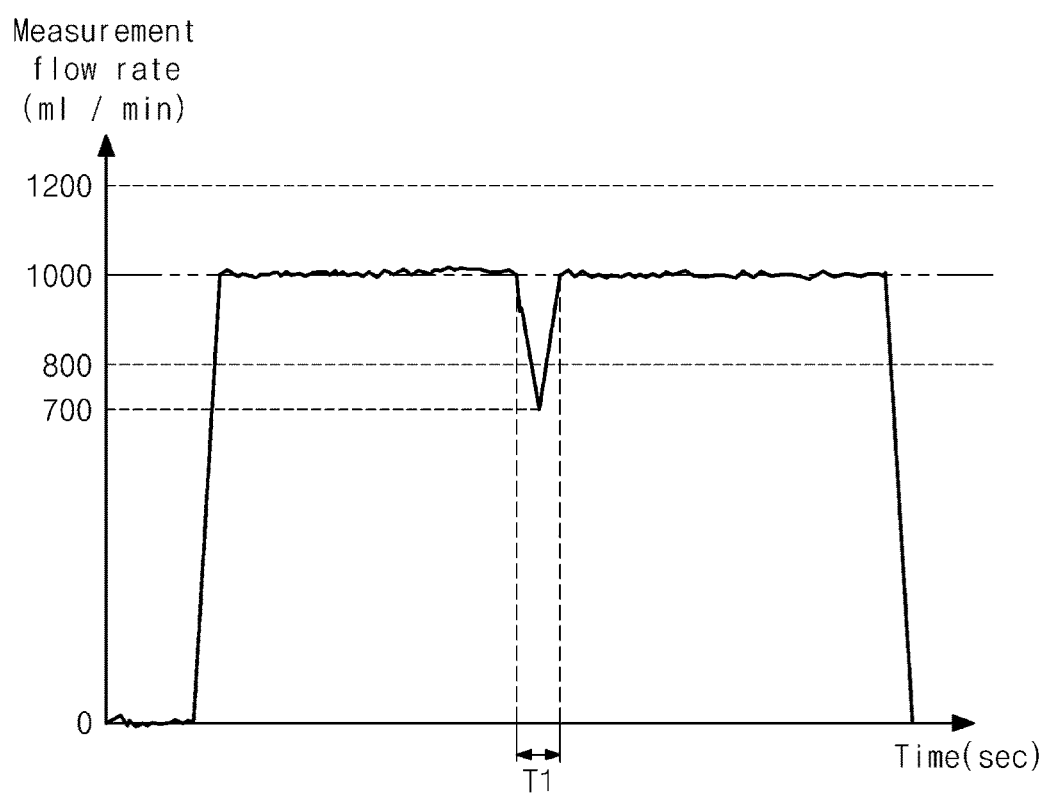
FIG. 6 is a graph schematically illustrating a measurement flow rate in a section in which a first error of FIG. 5 occurs.

FIG. 5 is a view schematically illustrating a state in which a received ultrasonic signal is delayed due to the presence of bubbles in a pipe according to one embodiment. FIG. 6 is a graph schematically illustrating a measurement flow rate in a section in which a first error of FIG. 5 occurs.

Referring to FIGS. 4 to 6, the liquid flows in the pipe 420. In addition, foreign substances may be present in the pipe 420. For example, a bubble B may be present in the pipe 420. When the bubble B is present in the pipe 420, the ultrasonic waves oscillated from the oscillator 452 may interfere by the bubble B. The ultrasonic wave interfering by the bubble B may be refracted and received by the receiver 454. In this case, the error is present in the data for the time at which the ultrasonic waves are received. That is, there is a signal delay error of the ultrasonic waves. That is, time data with an error is transmitted to the controller 470.

As illustrated in FIG. 6, when the bubble B is present in the pipe 420 in section T1, the measurement flow rate in the section T1 may be calculated as 700 (mL/min). For example, the range of the set flow rate range determined according to the recipe in the controller 470 may be 800 (mL/min) to 1,200 (mL/min). In this case, the measurement flow rate calculated in the section T1 deviates from the set flow rate range, but the measurement flow rate is calculated as 700 (mL/min), and accordingly, the controller 470 determines a first error state in which the ultrasonic signal is delayed. Accordingly, the controller 470 performs the first feedback mode S220.

In the first feedback mode S220, the set flow rate range may be changed. More specifically, in the first feedback mode S220, an upper limit of the set flow rate range may be lowered, and a lower limit of the set flow rate range may be increased. For example, when the set flow rate range is 800 (mL/min) to 1,200 (mL/min) in the normal state, the set flow rate range may be changed to 900 (mL/min) to 1,100 (mL/min) in the first feedback mode S220. However, this is for understanding only, and the present invention is not limitedly interpreted by the illustrated figures.

In addition, by applying a conservative parameter that narrowly changes the set flow rate range, it is possible to efficiently determine whether the error temporarily occurs due to bubbles or continuously occurs due to other causes. Specifically, in the first feedback mode S220, it is possible to efficiently determine whether the error temporarily occurs due to bubbles or continuously occurs to other causes by narrowly changing the set flow range. When the calculated measurement flow rate continuously deviates from the set flow rate range, the error is determined to be due to another cause, and the maintenance task for the liquid supply unit 400 can be performed. Conversely, when the calculated measurement flow rate temporarily deviates from the set flow rate range, the first feedback mode S220 may be released to change the set flow rate range back to a range to which the normal state belongs.

In addition, in the first feedback mode S220, the feedback control period may be changed. For example, in the first feedback mode S220, the feedback control period may be changed shorter than a feedback control period in a normal state. For example, when the feedback control cycle is performed at 1 second intervals in the normal state, the feedback control may be performed at 0.5 second intervals in the first feedback mode S220. Accordingly, it is possible to quickly determine whether the error temporarily occurs due to bubbles or continuously occurs according to other causes. However, this is for understanding only, and the present invention is not limitedly interpreted by the illustrated figures.

In the first feedback mode S220, the opening and closing rate of the valve 460 may be changed. More specifically, in the first feedback mode S220, the opening and closing rate of the valve 460 can be adjusted smaller than the opening and closing rate of the valve 460 in the normal state. With the change in the opening and closing rate of the valve 460, the discharge flow rate of the liquid discharged from the nozzle 430 may be feedback-controlled. Accordingly, based on the measurement flow rate with the error due to bubbles in the pipe in a first section T1, the discharge flow rate discharged to the substrate W cannot be rapidly changed. That is, the opening and closing rate of the valve may be changed small considering that the first error state is temporary due to a bubble.

Figure 7:
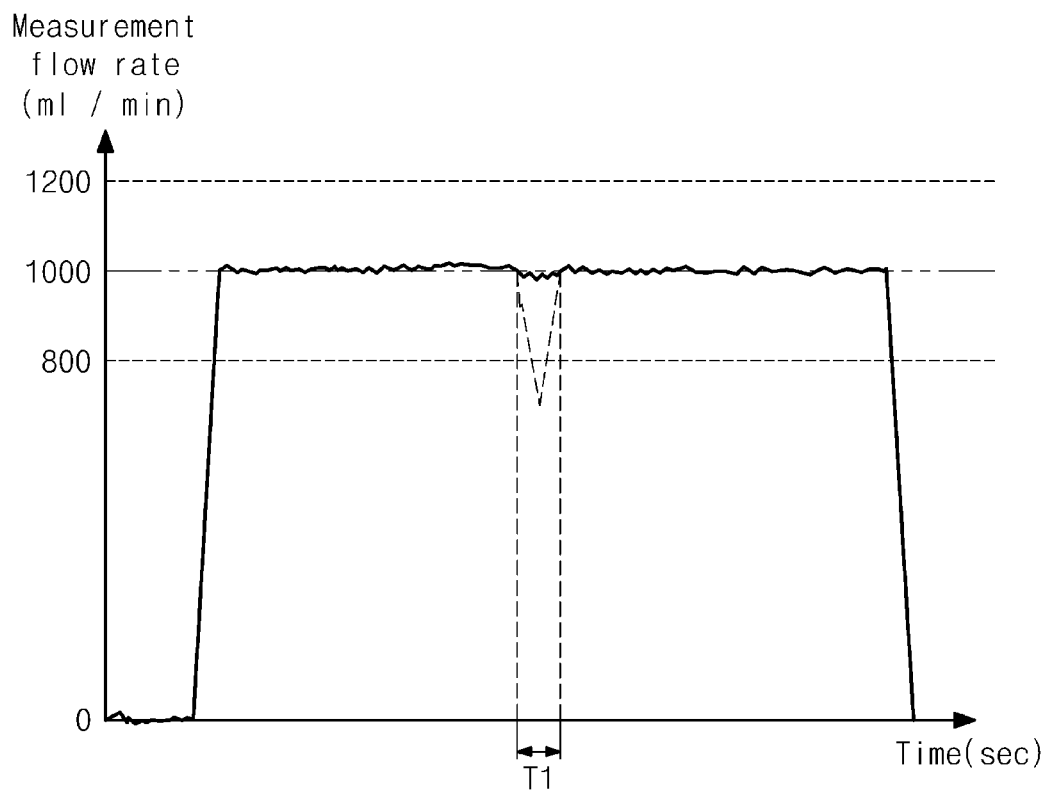
FIG. 7 is a graph schematically illustrating a discharge flow rate in a section in which the first error occurs after performing a first feedback mode according to one embodiment.

FIG. 7 is a graph schematically illustrating the discharge flow rate in a section in which the first error occurs after performing the first feedback mode according to one embodiment.

Referring to FIGS. 4, 6, and 7, the discharge flow rate discharged to the substrate W is identical or similar to the measurement flow rate in most sections. However, as described above, when the bubbles are present in the pipe 420 in the first section T1, and the type of error is determined as the first error state, the measurement flow rate may be rapidly lowered.

Accordingly, according to one embodiment of the present invention, the opening and closing rate of the valve 460 is changed smaller than that of the normal state, thereby preventing a rapid change in the flow rate due to a temporary error caused by the bubbles. That is, even if the measurement flow rate decreases rapidly due to the bubbles, the discharge flow rate of the liquid can be feedback-controlled such that the discharge flow rate discharged to the substrate W has a flow rate similar to the set flow rate (e.g., 1,000 mL/min). In other words, since the error is determined as the first error state, the first feedback mode S220 can be performed, minimizing the rapid change in the discharge flow rate in the first section T1.

On the other hand, even if the opening and closing rate of the valve 460 is changed small, the maintenance task on the liquid supply unit 400 can be performed when the measurement flow rate continuously deviates from the set flow rate range. In other words, the discharge flow rate can be prevented from being feedback-controlled based on the measurement flow rate with an error, thereby minimizing the rapid change in the flow rate of the liquid supplied to the substrate W.

Figure 8:
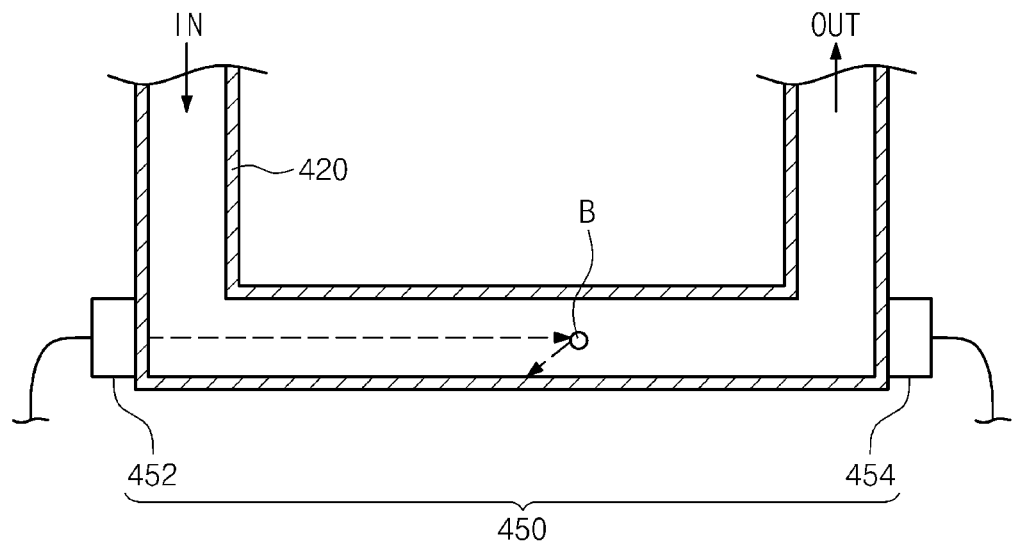
FIG. 8 is a view schematically illustrating a state in which the ultrasonic signal is not received due to the bubbles present in the pipe according to one embodiment.
Figure 9:
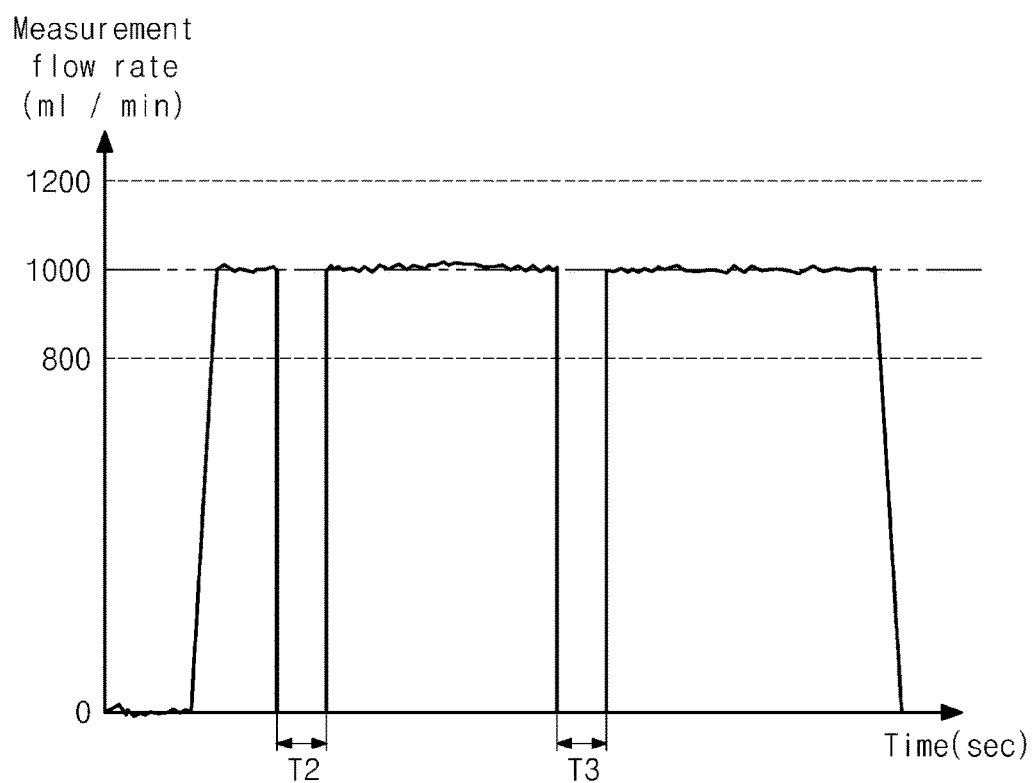
FIG. 9 is a graph schematically illustrating the measurement flow rate in a section in which a second error of FIG. 8 occurs.
Figure 10:
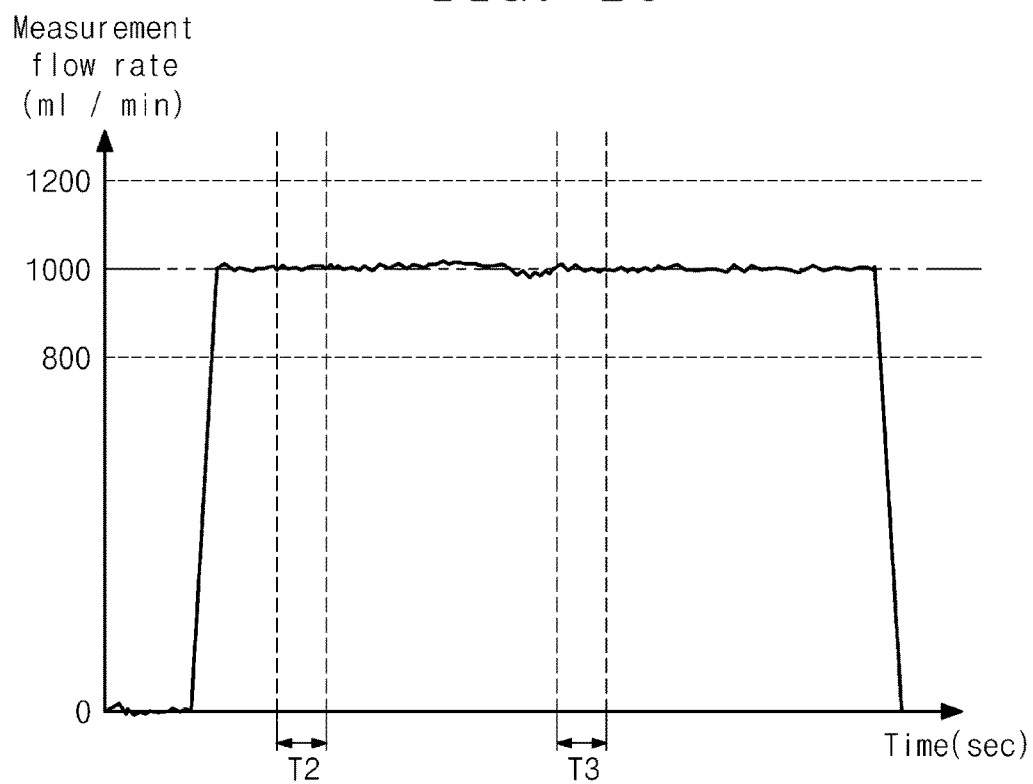
FIG. 10 is a graph schematically illustrating the discharge flow rate in a section in which a second error occurs after performing a second feedback mode according to one embodiment.

FIG. 8 is a view schematically illustrating a state in which the ultrasonic signal is not received due to the bubbles present in the pipe according to one embodiment. FIG. 9 is a graph schematically illustrating the measurement flow rate in a section in which a second error of FIG. 8 occurs. FIG. 10 is a graph schematically illustrating the discharge flow rate in a section in which a second error occurs after performing a second feedback mode according to one embodiment.

Referring to FIGS. 4, and 8 to 10, since the bubble B is present in the pipe 420 the ultrasonic waves oscillated from the oscillator 452 may interfere by the bubble B. The ultrasonic waves interfering by the bubble B may be refracted and not received by the receiver 454. In this case, the controller 470 may not transmit data on a time when the ultrasonic waves are received. In this case, the controller 470 calculates the measurement flow rate as zero. That is, the measurement flow rate data may not be calculated.

For example, as illustrated in FIG. 9, the controller 470 may calculate that the measurement flow rate is zero (mL/min) in a second section T2 and a third section T3. Accordingly, the controller 470 determines the error as a second error state in which the ultrasonic signal is not received, and performs the second feedback mode S230.

In the second feedback mode S230, the controller 470 calculates current predictive flow rate data of the liquid flowing in the pipe 420 based on the set flow rate. The current predictive flow rate data of the liquid may be calculated based on the set flow rate. For example, if the set flow rate determined according to the recipe is 1,000 (mL/min), the current predictive flow rate data may be 1,000 (mL/min). The opening and closing rate of the valve 460 is changed based on the calculated predictive flow rate data. With the change in the opening and closing rate of the valve 460, the discharge flow rate of the liquid discharged to the substrate W is feedback-controlled. For example, as illustrated in FIG. 10, if the predictive flow rate data calculated based on the current pump flow pressure data is 1,000 (mL/min), the controller 470 may change the opening and closing rate of the valve 460 such that the discharge flow rate is 1,000 (mL/min) in the second section T2 and the third section T3. In other words, the discharge flow rate can be prevented from being feedback-controlled based on the measurement flow rate with the error, thereby minimizing the rapid change in the flow rate of the liquid supplied to the substrate W.

When the measurement flow rate is calculated as 0 and the opening and closing rate of the valve 460 is feedback-controlled based on the calculation, the controller 470 may determine that the liquid does not flow in the pipe 420. In this case, when a large amount of flow pressure is supplied into the pipe 420 to have the set flow rate, there is a very high possibility that flow rate hunting occurs. That is, even when the simple bubble B is present in the pipe 420, the measurement flow rate is calculated as zero due to the bubble B, and the flow rate hunting may occur frequently.

Accordingly, according to one embodiment of the present invention described above, when the measurement flow rate is calculated as zero, the discharge flow rate of the liquid is proactively feedback-controlled based on the predictive flow rate data so as to prevent rapid variability. Subsequently, when the measurement flow rate is changed similarly to the flow rate in the normal state, the liquid supply to the substrate W may be continued while preventing the flow rate hunting. Conversely, subsequently, when the measurement flow rate is continuously calculated as zero, the liquid supply unit 400 is determined to have an abnormality due to another cause, and the maintenance task on the liquid supply unit 400 may be performed. According to the above-described embodiment, it is possible to efficiently determine a suitable feedback control method according to the situations by changing feedback control according to the type of error.

Unlike the above-described example, the predictive flow rate data may be calculated based on the flow pressure data of the pump 440 based on the set flow rate determined according to the recipe.

In the above-described example, a case of performing the feedback control of the discharge flow rate by changing the opening and closing rate of the valve 460 has been described as an example, but the present invention is not limited thereto. For example, the controller 470 may control the set flow rate by controlling the pump 440.

In addition, in the above-described example, a case of performing the cleaning process of cleaning the substrate in the process chamber 300 has been described as an example, but the present invention is not limited thereto. For example, the above-described embodiments may be equally or similarly applied to various processes using a liquid, such as a coating process of forming a coating film on the surface of the substrate by supplying a photoresist to the substrate.

The foregoing detailed description illustrates the present invention. Further, the above content illustrates and describes the exemplary embodiment of the present invention, and the present invention can be used in various other combinations, modifications, and environments. That is, the foregoing content may be modified or corrected within the scope of the concept of the invention disclosed in the present specification, the scope equivalent to that of the disclosure, and/or the scope of the skill or knowledge in the art. The foregoing exemplary embodiment describes the best state for implementing the technical spirit of the present invention, and various changes required in specific application fields and uses of the present invention are possible. Accordingly, the detailed description of the invention above is not intended to limit the invention to the disclosed exemplary embodiment. Further, the accompanying claims should be construed to include other exemplary embodiments as well.

What is claimed is:

1. A method for treating a substrate, comprising:
    calculating a flow rate of a liquid, comparing a calculated measurement flow rate of the liquid with a set flow range of the liquid in a normal state, and determining whether an error occurs in the measurement flow rate; and
    when an error is determined to occur in the measurement flow rate in the calculating, performing feedback control of a discharge flow rate of the liquid discharged to the substrate by adjusting a valve opening rate based on the calculated measurement flow rate, wherein the performing determines a type of the error, and differently performs the feedback control according to the determined type of the error, and wherein, the type of error includes:
a first error state in which the measurement flow rate deviates from a range of the set flow rate, but the measurement flow rate is calculated; and
a second error state in which the measurement flow rate is not calculated, wherein the performing includes a first feedback mode performed in the first error state, wherein in the first feedback mode, an upper limit of the set flow range is lowered and a lower limit of the set flow range is increased, and wherein, upon determining that the first error has stopped occurring, the performing restores the upper limit and the lower limit to the normal state.

2. The method for treating a substrate of claim 1, wherein in the first feedback mode, a period of the feedback control is adjusted shorter than that of the normal state.

3. The method for treating a substrate of claim 1, wherein in the first feedback mode, the opening rate and closing rate of the valve is adjusted smaller than that of the normal state.

4. The method for treating a substrate of claim 1, wherein the performing further includes a second feedback mode performed in the second error state, and
the second feedback mode calculates current predictive flow rate data of the liquid based on the set flow rate and performs feedback control of the discharge flow rate based on the predictive flow rate data.

5. The method for treating a substrate of claim 4, wherein in the calculating, the measurement flow rate oscillates ultrasonic waves at one point of a pipe through which the liquid flows, receives the ultrasonic waves at an other point of the pipe, and measures and calculates an arrival time of the ultrasonic waves from the one point to the other point.

6. The method for treating a substrate of claim 5, wherein the error occurs when bubbles are present in the liquid.

7. The method for treating a substrate of claim 6, wherein the first error state includes a state in which the ultrasonic waves oscillated into the pipe is refracted by the bubbles and received, and a signal of the ultrasonic waves is delayed.

8. The method for treating a substrate of claim 6, wherein the second error state includes a state in which the ultrasonic waves oscillated into the pipe is refracted by the bubbles, and the signal of the ultrasonic waves is not received.

9. The method for treating a substrate of claim 1, wherein the liquid includes a cleaning liquid that cleans the substrate.

10. A method for controlling a flow rate, the method comprising:
oscillating ultrasonic waves at one point in a pipe through which a fluid flows, receiving the ultrasonic waves at an other point of the pipe, measuring an arrival time of the ultrasonic waves from one point to the other point to calculate a measurement flow rate of the liquid flowing in the pipe, and determining an error of the measurement flow rate by comparing the measurement flow rate with a set flow range of the liquid in a normal state;
determining the type of error; and
performing feedback control of a discharge flow rate of the liquid discharged to a target according to the type of error determined in the determining step, wherein the performing includes:
a first feedback mode performed in a first error state in which the measurement flow rate is calculated in a state in which the measurement flow rate deviates from a range of the set flow rate; and
a second feedback mode performed in a second error state in which the measurement flow rate is not calculated, wherein in the first feedback mode, an upper limit of the set flow range is lowered and a lower limit of the set flow range is increased, and wherein, upon determining that the first error state has stopped occurring, the performing restores the upper limit and the lower limit to the normal state.

11. The method for controlling a flow rate of claim 10, wherein in the first feedback mode, a period of the feedback control is adjusted shorter than that of the normal state, and
wherein in the first feedback mode, an opening and closing rate of a valve is adjusted smaller than that of the normal state.

12. The method for controlling a flow rate of claim 10, wherein the second feedback mode calculates predictive flow rate data based on the set flow rate in the normal state, and performs feedback control of the discharge flow rate based on the predictive flow rate data.

13. The method for controlling a flow rate of claim 10, wherein the error is generated bubbles that are present in the pipe.

14. An apparatus for treating a substrate, comprising:
a support unit configured to support the substrate;
a nozzle configured to discharge a liquid to a substrate supported by the support unit;
a pipe connected to the nozzle to allow the liquid to flow inside;
a sensor configured to oscillate ultrasonic waves at one point inside the pipe and receives ultrasonic waves at an other point inside the pipe;
a valve installed in the pipe and configured to control an opening and closing rate of the pipe; and
a controller configured to measure an arrival time of the ultrasonic waves from one point to the other to calculate a measurement flow rate of the liquid flowing in the pipe and perform feedback control of the opening and closing rate of the valve according to the measurement flow rate, wherein the controller is configured to determine an error of the measurement flow rate by comparing the measurement flow rate with a set flow rate of the liquid in a normal state and differently performs feedback control of the opening and closing rate of the valve according to a type of the determined error, and wherein the type of the error includes:
a first error state in which the measurement flow rate deviates from a range of the set flow rate, but the measurement flow rate is calculated; and
a second error state in which the measurement flow rate is not calculated, wherein the controller changes a first feedback mode in the first error state, wherein in the first feedback mode, an upper limit of the set flow range is lowered and a lower limit of the set flow range is increased, and wherein, upon determining that the first error has stopped occurring, the controller restores the upper limit and the lower limit to the normal state.

15. The apparatus for treating a substrate of claim 14, wherein the sensor is a piezoelectric element.

16. The apparatus for treating a substrate of claim 14, wherein in the first feedback mode, a period of feedback control is adjusted shorter than that of the normal state.

17. The apparatus for treating a substrate of claim 14, wherein in the first feedback mode, an opening and closing rate of the valve is adjusted smaller than that of the normal state.

\* \* \* \* \*